Figure 1:
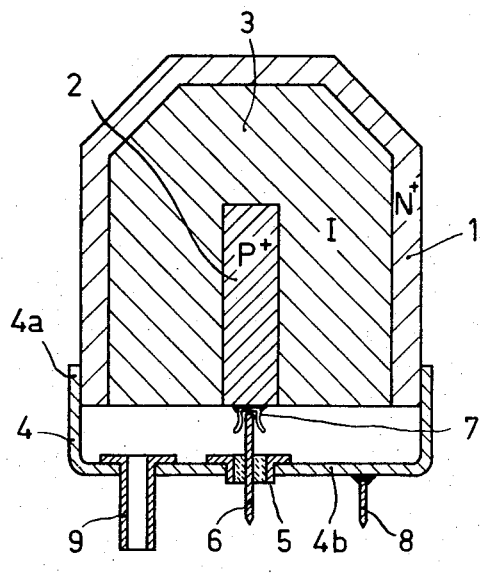

United States Patent

Meuleman et al.

[15] 3,697,825
[45] Oct. 10, 1972

[54] RADIATION DETECTOR
[72] Inventors: Johannes Meuleman; Michel Aussant, both of Caen, France
[73] Assignee: U.S. Philips Corporation, New York, N.Y.
[22] Filed: Jan. 26, 1971
[21] Appl. No.: 109,782

[30] Foreign Application Priority Data

Jan. 26, 1970 France......................7002618
Dec. 4, 1970 France......................7043724

[52] U.S. Cl..........317/234 R, 317/234 P, 317/234 G, 317/234 N, 317/235 N, 317/235 AD
[51] Int. Cl..............................................H01l 15/00
[58] Field of Search.............317/234 P, 234 G, 235 N, 234 N, 317/235 A D; 29/589, 447

[56] References Cited

UNITED STATES PATENTS

| 3,476,986 | 11/1969 | Tsuji | 317/234 |
| 3,280,383 | 10/1966 | Emeis | 317/234 |
| 3,008,089 | 11/1961 | Uhlir, Jr. | 330/5 |
| 2,986,591 | 5/1961 | Swanson et al. | 136/89 |

Primary Examiner—Martin H. Edlow
Attorney—Frank R. Trifari

[57] ABSTRACT

A method of connecting a semiconductor crystal of a radiation detector to a support, for example, a Ge-Li detector, in which the support is constructed with a connection part the shape of which is adapted to a circumferential connection surface which is present on a side face or in a cavity of the crystal. Prior to the connection, the connection part of the support is brought to a temperature which differs from the operating temperature of the radiation detector, after which the support and the crystal are slid one into the other until the connection part of the support is located opposite to the connection surface of the crystal. The support is then brought to the operating temperature of the detector and the crystal is connected to the support in a clamping manner.

7 Claims, 9 Drawing Figures

RADIATION DETECTOR

The invention also relates to a radiation detector. In a particularly favourable embodiment the connection part of the support consists of a metal collar which is forced against the connection surface of the crystal by means of a metal shrink ring.

The invention relates to a method of connecting a semiconductor crystal of a radiation detector to a support, the crystal comprising a rectifying junction which is formed between two zones of opposite conductivity types which may be separated by an intrinsic zone, the material of the support being such that the dimensions of the support may vary with temperature. The invention also relates to a radiation detector.

The progress made in the technology of manufacturing semiconductor materials has enabled monocrystalline rods of ever increasing dimensions to be obtained; this is of advantage to obtain semiconductor detectors of the coaxial type, that is, detectors in which the zones of opposite conductivity type are at least partly coaxial or of the planar type, that is, detectors in which the detecting junction is formed between two flat layers of the opposite conductivity type. In detectors, it has always been endeavored to increase the effective volume so as to increase the efficiency. In order to improve the quality of the response signals of detectors, it is also of advantage to provide an intrinsic zone which is present between the two zones of the opposite conductivity type, said intrinsic zone being obtained, for example, in known manner by diffusion of compensating impurities such as lithium.

Such a detector is generally enclosed in a hermetic envelope of which the support forms part, but for certain applications an envelope may be dispensed with. For example, certain coaxial detectors which are used as probes require no envelope since their lateral surfaces must be entirely free to be able to receive all the rays whatever the orientation of the detector may be.

It is moreover necessary for the dimensions of the support to be as small as possible, so that they cover only a very small part of the lateral surface. An increase of the effective volume of the crystal, however, simultaneously causes an increase in weight, so that the connection becomes difficult, as well as the centering in the support. The crystal tends either to rotate relative to the support, in particular when a cylindrical crystal is used, or to slide in the support which generally results in the connection being interrupted, the sensitivity being decreased and a poor thermal contact being obtained.

In order to avoid these drawbacks, prior art shows, in general, on the one hand to increase the thickness of the support and on the other hand to reinforce the connection means of the support on the crystal. However, an increase in thickness of the support which normally is of metal, may cause or increase the phenomenon of retrodiffusion and re-emission of the rays, and the reinforcement of the connection means results in the performance of additional manufacturing operations, either to the crystal or to the support which both increases the cost of the detector and involves a possibility of damage during the additional manufacturing operations.

For certain applications, the entrance window of planar detectors must be in direct contact with the rays without the interposition of a layer of a metal or of ceramic, however thin it may be, since the layer may cause a retrodiffusion or two large an absorption of the rays. In such a case, it is difficult to obtain an envelope which is both rigid and hermetic.

The invention enables the rigid connection of a semiconductor crystal of a detector to its support, in which only a small part of the lateral crystal surface is used. In the case of a crystal having coaxial zones, the invention enables the crystals to be connected to the support without using the outermost lateral crystal surface provided the crystal comprises a cavity.

According to the invention, the method described in the preamble is characterized in that the support is constructed with a connection part the shape of which is adapted to a circumferential connection surface which is present on a side face or in a cavity of the crystal, that the connection part of the support is brought to a temperature which differs from the operating temperature of the radiation detector, after which the support and the crystal are slid one into the other until the connection part of the support is located opposite to the connection surface of the crystal, after which the support is brought to the operating temperature of the detector and the crystal is secured to the support in a clamping manner.

Such a connection can be realized in that the connection part of the support is subjected to expansion or shrinkage.

In a very favourable embodiment of the method according to the invention, the connection surface of the crystal and the connection part of the support, prior to the clamping connection, are brought at an angle relative to their center line in such manner that one of them converges and the other diverges. The centering of the crystal relative to the support is made possible in a simple manner. When the support and the crystal are slid one into the other, the angles of the connection surface and the connection part need not necessarily be the same. The angles may be chosen in accordance with the coefficient of expansion of the connection part in such manner that the connection surface and the connection part readily engage each other at the normal operating temperature of the detector. The angle must be large enough to enable centering of the crystal relative to the support, but small enough to prevent the crystal from being forced out of the support during clamping. The angles preferably have a value of a few degrees and are at any rate smaller than 30°.

The invention also relates to a radiation detector comprising a semiconductor crystal having a rectifying junction which is formed between two zones of opposite conductivity types which may be separated by an intrinsic zone, and a support to which the crystal is connected. According to the invention, such a detector is characterized in that the support comprises a connection part which is present directly around or in a connection surface of the crystal adapted in shape, the connection consisting of a shrink connection or an expansion connection, the connection part of the support being electrically conductive and in electric contact with one of the semiconductor zones of the crystal.

In this case, it is possible to obtain a favourable connection of the crystal to the support for which only a small part of the lateral surface of the crystal is necessary. In this manner, the detector has a large field of application, in particular, because an optimum part of the radiation-sensitive surface is not covered by the support. Moreover, the support is inexpensive and can be adapted to all kinds of shapes of the crystal.

According to a favourable embodiment, the connection part of the support consists of at least two elements one of which has the form of a comparatively flexible collar which surrounds a part of the crystal, the other element consisting of a shrink ring which forces the collar against the crystal. A very readily operating and excellent vacuum-tight connection is obtained.

The favourable effect is even increased if, according to the invention, the connection part of the support and the associated connection surface of the crystal enclose an angle which is smaller than 30°, preferably an angle of a few degrees relative to the center line of the detector.

In order that the invention may be readily carried into effect, a few examples thereof will now be described in greater detail, by way of example with reference to the accompanying drawings, in which FIGS. 1 to 9 are diagrammatic cross-sectional views of various embodiments of a detector according to the invention.

The radiation detector shown in FIG. 1 comprises a semiconductor crystal consisting of germanium or silicon of, for example, a cylindrical shape comprising two axial zones 1 and 2 of opposite conductivity types which are separated by an intrinsic zone 3 which in general is lithium-compensated. It is to be noted that the outermost zone 1 entirely surrounds the crystal with the exception of the surface where the innermost zone 2 reaches up to the circumference.

The crystal is connected to a support 4 in the form of a cup in which the edge 4a of the support 4 surrounds the crystal on the side where the zone 2 reaches the circumference. In this case, the connection is obtained by expansion of the metal of the edge 4a of the support and then causing the metal of shrink again after the edge has been positioned relative to the crystal, the expansion being obtained by heating and the shrinkage being obtained by cooling to the operating temperature.

In order to obtain an electric connection with the zone 2, when the support 4 consists of metal, an insulated lead-in member 5 is arranged in the bottom 4b of the support through which member a connection wire 6 is passed which at its end is forced in a flexible grip 7 which was previously soldered to the layer 2. The connection wire 8 is directly welded to the support to obtain a connection to the zone 1, since the edge 4a is in electric contact with the zone 1.

In order to be able to evacuate, after providing the support, the space which is formed between the inner wall of the support 4 and the end of the crystal which is provided in the support, an exhaust tube 9 is provided which is hermetically sealed when the vacuum in the space is sufficiently large.

Such a construction has the advantage that it can be obtained in a simple and rapid manner, is not very expensive, and ensures a perfect seal.

Figure 2:
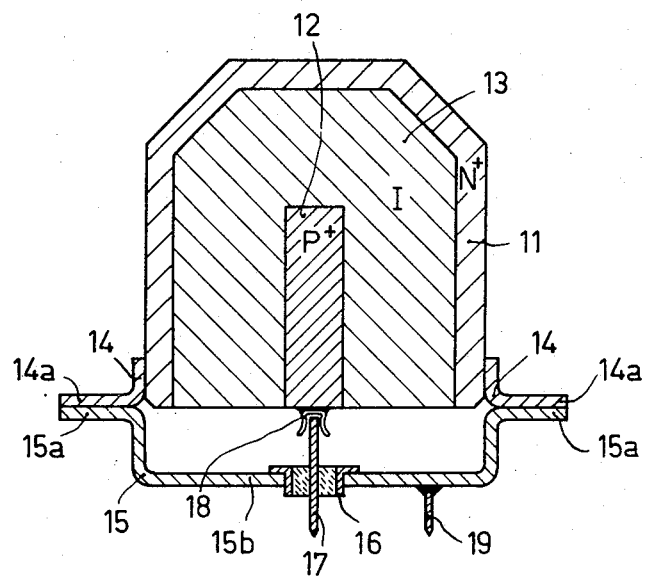

The detector shown in FIG. 2 generally corresponds to the detector shown in FIG. 1. A cylindrical crystal comprises two coaxial zones 11 and 12 of opposite conductivity types, separated by an intrinsic zone 13. At the end of the crystal where the inner zone 12 reaches the surface, a metal collar 14 is secured in the same manner as the edge 4a in FIG. 1, which collar also presses against the layer 11.

When the crystal is rigidly secured to the collar 14, the flange 14a of the collar is welded to the flange 15a of a support 15 which is cup-shaped, in which the connection of the flange 14a to the support 15 can be varied out either by cold welding or by the electric welding.

As in the construction shown in FIG. 1, an insulating lead-in member 16 is arranged in the bottom 15b of the support 15, through which member a connection wire 17 is threaded which is again clamped in a flexible grip 18 which was previously soldered to the semiconductor zone 12, while a conductor 19 is directly welded to the support 15 to obtain an electric connection with the zone 11.

The connection of the crystal to the support can be carried out in a vacuum, in which an exhaust tube in the bottom of the support can be dispensed with, so that the dimensions of the detector become smaller.

Figure 3:
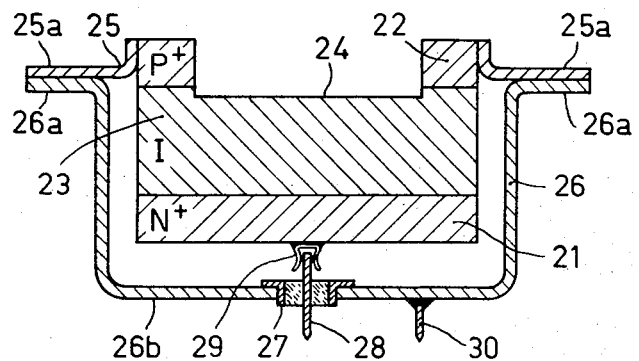

FIG. 3 relates to a detector of the planar type, the crystal of which comprises two layers 21 and 22 of opposite conductivity types laid one on the other with the interposition of an intrinsic layer 23. In known manner an entrance window 24 is provided in the layer which is exposed to the radiation to be detected. On the circumference of the layer which is destined to receive the radiation, a collar 25 which comprises a large flange 25a is secured in the manner described with reference to FIGS. 1 and 2. The flange 25a is then welded to a flange 26a of a support 26 in the form of a cup by means of cold welding or by electric welding.

The inner dimensions of the support 26 are chosen to be slightly larger than those of the detector so as to avoid any possibility of shortcircuit between the layer 22 and the layers 23 and 21.

As in the detectors shown in FIGS. 1 and 2, the bottom of the support 26 comprises an insulating lead-in member 27 through which a connection wire 28 projects which is held in a flexible grip 29 which was previously soldered to the layer 21. A conductor 30 which is directly welded to the bottom 26 of the support ensures an electric connection with the layer 22 via the flanges 26a and 25a and the collar 25.

Figure 4:
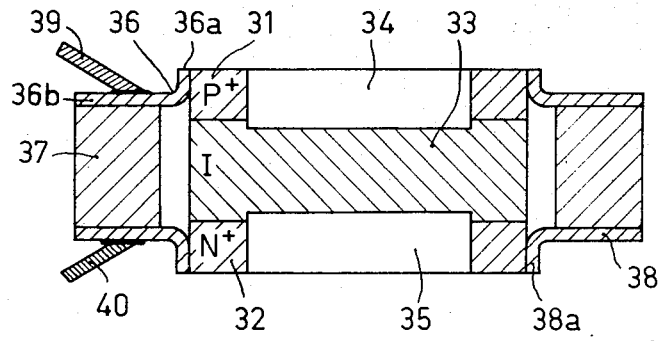

The detector shown in FIG. 4 is of the planar type and its crystal comprises two layers 31 and 32 of opposite conductivity types separated by an intrinsic layer 33 and comprising two entrance windows 34 and 35. On the circumference of one of the two layers of opposite conductivity types, for example 31, a first collar 36 is shrunk with its face 36a, while previously a ring 37 of an insulating material, for example aluminium oxide or beryllium oxide, was soldered to the flange 36b. A second collar 38 of the same shape as collar 36 is soldered to the surface of the ring 37 opposite to the collar 36, and the surface 38a is secured to the circumference of the layer 32 likewise by expansion and shrinkage. Conductors 39 and 40 are then welded to the collars 36 and 38, respectively, to obtain an electrical connection of the crystal with the outer world.

Figure 5:
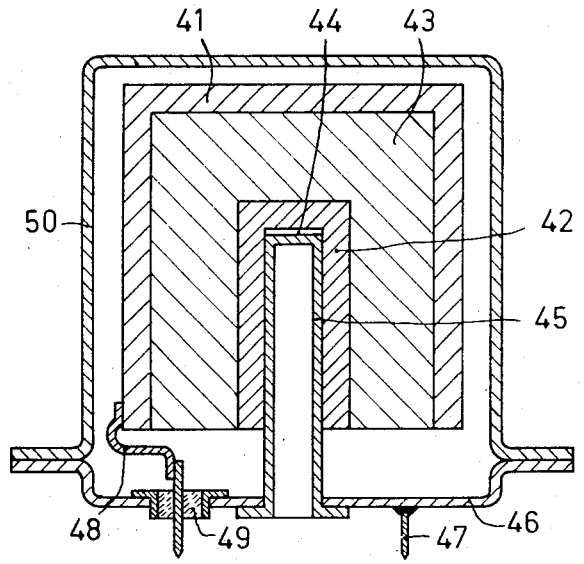

The detector shown in FIG. 5 comprises a crystal which has semiconductor zones 41 and 42 which are situated coaxially, have opposite conductivity types and are separated by an intrinsic layer 43. Said detector has a blind hole 44, the layer 42 covering the wall of said hole. The crystal thus formed is secured with its blind hole 44 to a metal tubular rod 45 which was previously welded or soldered to the support 46. The support 46 is in the form of a cup. After having reduced the temperature of tube 45, tube 45 is inserted in the hole 44. In this case, the connection of the crystal to the support takes place by expansion of the tubular rod 45 after having again reached the operating temperature of the crystal. The electric connection between the layer 42 and the external connection wire 47 which is soldered to the support 46 is obtained by means of the rod 45. The connection to the layer 41 as obtained by the connection wire 48 which is soldered with one end to the layer 41 and projects through the support 46 by means of the glass-metal lead-in member 49. The cover 50 is chosen to consist either of metal or of an insulating material, dependent upon its application, and, if it consists of metal, it is connected to the support 46 by means of cold welding and, if it consists of an insulating material, for example, ceramic, it is soldered.

Figure 6:
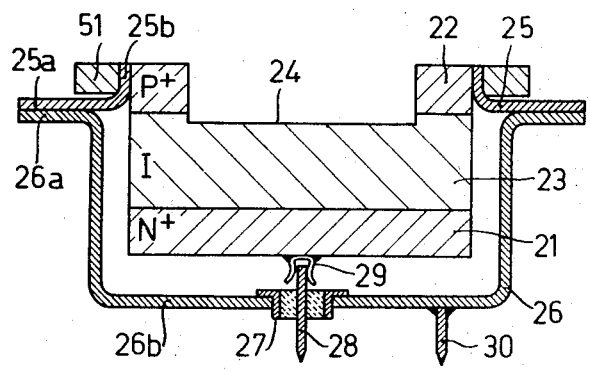

In the embodiment shown in FIG. 6, the support comprises at least two parts one of which forms a collar which is comparatively flexible and which surrounds a part of the crystal. The other part consists of a shrink ring which presses the collar against the crystal. This variation comprises the planar detector which has been described with reference to FIG. 3, but it is obvious that said variation can also be used in coaxial detectors and in other supports already described. In FIGS. 3 and 6, the same reference numerals are used for the same components.

On the circumference of the layer 22 are successively provided a metal collar 25 having dimensions which are slightly larger than those of the crystal, and a shrink ring 51 which also consists of metal and which is subjected to expansion by preceding heating. When the shrink ring 51 is again brought to the operating temperature, it shrinks and forces the surface 25b of the collar 25 against the circumference of the layer 22.

The flange 25a of the collar 25 is then welded to the flange 26a of the support 26, which support shows the form of a cup.

One of the advantages of the embodiments shown resides in the fact that the surface of the detector which is subjected to radiation can be used maximum and that moreover a very large efficiency is obtained.

Figure 7:
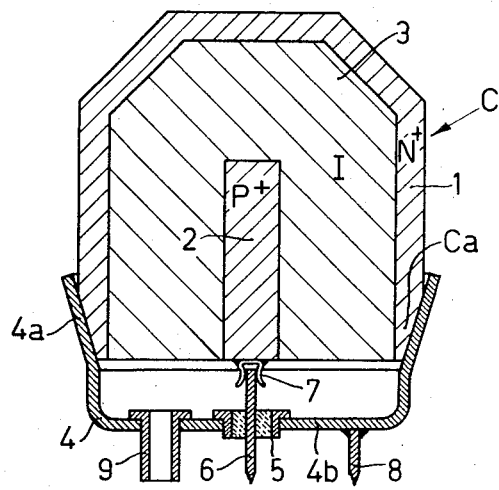

The embodiment shown in FIG. 7 mainly corresponds to the embodiment shown in FIG. 1. The crystal C comprises a conical converging end Ca which is secured to a widened edge 4a of the support 4 in the manner described with reference to FIG. 1. This embodiment enables a simple centering of the crystal relative to the support, is cheap, and has an excellent vacuum-tightness.

Figure 8:
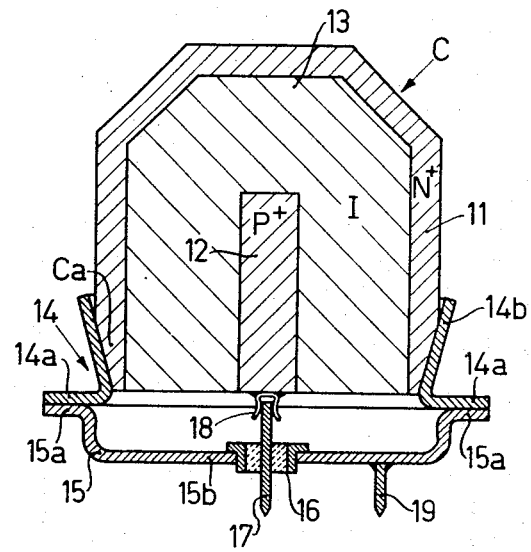

The embodiment shown in FIG. 8 differs from that shown in FIG. 2 only in that a collar 14 which has a widened edge 14b is secured to a conical converging end Ca of the crystal C in the manner already described. In this case also the centering of the crystal is simplified and the tightness of the connection is particularly good.

Figure 9:
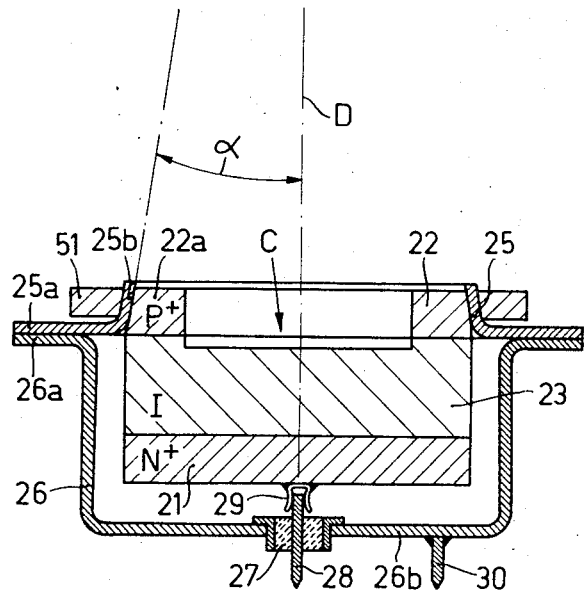

A very favourable embodiment of the detector is shown in FIG. 9. It mainly corresponds to the construction shown in FIG. 6. It comprises a semiconductor crystal C in the form of a cylindrical disc and comprises two zones 21 and 22 of opposite conductivity types separated by an intrinsic zone 13.

The region 22a of the side face of the crystal C which is preferably situated on the layer 22 is ground in such manner as to have a slightly conical converging shape. To region 22a are successively connected a metal collar 25 and a shrink ring 51 which also consists of metal. Prior to the connection, the shrink ring has been expanded by increase in temperature and, after cooling, forces the edge 25 of the collar 25 against the connection surface 22a of the crystal as a result of shrinkage. The flange 25a of the collar 25 is then welded to the flange 26a of the support 26, which support has the shape of a cup which surrounds the crystal. In order to be able to readily position the various components, the edge 25b and the shrink ring 51 have an equal conicity and, viewed to the outside of the semiconductor device, they converge so that their conical shape mainly corresponds to that of the connection surface 22a of the crystal C.

In the embodiment shown in FIG. 9 the crystal consists of germanium in which the zone 21 is of the $n$-type and the zone 22 is of the $p$-type, the intrinsic layer being compensated with lithium. The collar 25 is formed from aluminium and the shrink ring 26 is of stainless steel. It has proved possible, taking into account the coefficients of expansion of the various components, to give the wall 25b, the connection surface 22a and the shrink ring 51 the same conicity; the angle $\alpha$ in this example is chosen to be equal to 2°30′, but in general it may lie between 0° and 30°. In order to simplify the shrinkage, the wall 25b preferably has a flexible and thin construction. In order to obtain an efficacious connection, the shrink ring was heated to a temperature of approximately 300° C, the shrinkage of the ring being obtained by cooling to the temperature of liquid nitrogen.

Experiments, inter alia the helium test, have demonstrated that an excellent vacuum-tight connection can be obtained even with temperature shocks to 77°K. Attention should be paid to a careful finishing of the connection surface of the crystal and an adaptation of the dimensions of said connection surface to the connection part of the support, in accordance with the coefficients of expansion of the components. If desirable, the connection surface of the crystal may be provided with a very thin layer of metal, for example, gold.

What is claimed is:

1. In a radiation detector comprising a semiconductor crystal having a rectifying junction between two zones of opposite conductivity types and a support to which the crystal is connected, the improvement wherein, the support comprises at least one electrically conductive annular connection part which engages the crystal in a connection around an annular contact part of one of the semiconductor zones of the crystal, said connection part being in electrical contact with said contact part, being adapted to the shape of said contact part, being continuous and uninterrupted around said contact part, and being in tension around said contact part while said contact part is in compression.

2. In a radiation detector comprising a semiconductor crystal having a rectifying junction between two zones of opposite conductivity types and a support to which the crystal is connected, the improvement wherein, the support comprises at least one electrically conductive annular connection part which engages the crystal in a connection inside an annular contact part of one of the semiconductor zones of the crystal, said connection part being in electrical contact with said contact part, being adapted to the shape of said contact part, being continuous and uninterrupted around said contact part, and being in compression around said contact part while said contact part is in tension.

3. A radiation detector as claimed in claim 1, wherein the crystal is cylindrical, the connection part comprises a flexible collar which contacts the crystal at said contact and a shrink ring for pressing the collar against said contact part.

4. A radiation detector as claimed in claim 1, wherein the crystal is cylindrical, the support comprises a cup-shaped part and a collar, said cup-shaped part and said collar each having a flange, said flanges being connected together, said collar forming part of said connection part and contacting said crystal to form an hermetically sealed spaced between said cup-shaped part and said contact part.

5. A radiation detector as claimed in claim 1 wherein the support comprises a plurality of connection parts, said support comprising an annular member of an insulating material and two conductive collars, each of said collars having a flange attached to said annular member and each of said collars forming one of said connection parts and contacting different semiconductor zones of the crystal.

6. A radiation detector as claimed in claim 2, wherein the crystal has a cavity, said contact part being inside said cavity, and said connection part has a uniform cross-section at least in the vicinity of said contact part of the crystal.

7. A radiation detector as claimed in claim 2, wherein the connection part at said contact part and said contact part each have the same angle relative to the center line of the detector, said angle being less than 30°.

* * * * *